United States Patent
Nabi et al.

(10) Patent No.: US 11,162,701 B2
(45) Date of Patent: Nov. 2, 2021

(54) CONTROLLING HVAC SYSTEM BY INVERSING AIRFLOW DYNAMICS

(71) Applicant: Mitsubishi Electric Research Laboratories, Inc., Cambridge, MA (US)

(72) Inventors: Saleh Nabi, Arlington, MA (US); Hongtao Qiao, Wakefield, MA (US); Piyush Grover, Lincoln, NE (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/800,383

(22) Filed: Feb. 25, 2020

(65) Prior Publication Data

US 2021/0262682 A1    Aug. 26, 2021

(51) Int. Cl.

| | |
|---|---|
| F24F 11/46 | (2018.01) |
| F24F 11/00 | (2018.01) |
| F24F 11/56 | (2018.01) |
| F24F 11/64 | (2018.01) |
| F24F 11/65 | (2018.01) |

(Continued)

(52) U.S. Cl.
CPC .......... *F24F 11/46* (2018.01); *F24F 11/0001* (2013.01); *F24F 11/0008* (2013.01); *F24F 11/56* (2018.01); *F24F 11/64* (2018.01); *F24F 11/65* (2018.01); *G05B 19/042* (2013.01); *F24F 2110/10* (2018.01); *F24F 2110/20* (2018.01); *F24F 2120/12* (2018.01); *F24F 2140/50* (2018.01); *F24F 2140/60* (2018.01); *G05B 2219/2614* (2013.01)

(58) Field of Classification Search
CPC ..................... G05B 2219/2614; F24F 2120/12
See application file for complete search history.

(56) References Cited

U.S. PATENT DOCUMENTS

| | | | | |
|---|---|---|---|---|
| 2015/0006129 | A1* | 1/2015 | An | G06F 30/20 |
| | | | | 703/2 |
| 2015/0134123 | A1* | 5/2015 | Obinelo | F24F 11/30 |
| | | | | 700/277 |
| 2018/0219374 | A1* | 8/2018 | Pavlak | G05B 15/02 |

OTHER PUBLICATIONS

W Zuo, Coupling Indoor Airflow, HVAC, Control and Building Envelope Heat Transfer in the Modelica Building Library, 2016, Building Performance Simulation, 9(4): 366-381, https://engineering.purdue.edu/~yanchen/paper/2016-7.pdf (Year: 2016).*

* cited by examiner

*Primary Examiner* — Nathan L Laughlin
(74) *Attorney, Agent, or Firm* — Gennadiy Vinokur; Hironori Tsukamoto

(57) ABSTRACT

A control system for controlling an operation of a heating ventilation and air conditioning (HVAC) system is provided. The control system comprises an input interface configured to accept data indicative of a target distribution of thermal state in an environment, and a memory configured to store an airflow dynamics model (ADM) and an HVAC model. The control system further comprises a processor configured to inverse the ADM to estimate values of boundary conditions for inlet locations defining target thermal state at the inlet locations that result in the target distribution of thermal state in the environment; determine, using the HVAC model, target control parameters of actuators of the HVAC system resulting in the target thermal state at the inlet locations; and submit control commands to the HVAC system to operate the actuators of the HVAC system according to the control parameters.

12 Claims, 13 Drawing Sheets

(51) Int. Cl.
  *G05B 19/042* (2006.01)
  *F24F 110/10* (2018.01)
  *F24F 110/20* (2018.01)
  *F24F 120/12* (2018.01)
  *F24F 140/50* (2018.01)
  *F24F 140/60* (2018.01)

CONTROLLING HVAC SYSTEM BY INVERSING AIRFLOW DYNAMICS

TECHNICAL FIELD

This invention relates generally to heating, ventilating, and air-conditioning (HVAC) systems, and more specifically to systems and methods for controlling an operation of heating, ventilating, and air-conditioning (HVAC) systems.

BACKGROUND

Dynamics of air flow has a great impact for Building Energy Simulation (BES) on heating and cooling load calculation. Ventilation systems that involve stratified airflow distributions are emerging, as they can achieve better thermal comfort and energy performance. For example, displacement ventilation, natural ventilation, and advanced ventilation methods. These ventilation systems are provided for large spaces or spaces with high heat gain. Hence, a coupling of two dynamics i.e. BES and air flow dynamics (given by CFD) is required. The building energy simulation (BES) is used to predict thermal loads, system (building), response to the thermal loads, and resulting energy use, along with building energy performance metrics like occupant comfort and energy consumption cost. The computational fluid dynamics (CFD) is used to predict information of airflow, temperature and humidity distribution in a room.

Each of such models, in a stand-alone fashion, suffers from certain limitations. The BES models, e.g. EnergyPlus, TRNSYS, ESP-r, IDA-ICE, BSIM, assume that indoor air is well mixed in order to simplify the computation and, therefore, do not account for stratification of airflow and temperature or non-uniform sources of heat loads. Such limitations, in turn, lead to inaccurate predictions of the building energy consumption and closed-loop control performance of HVAC systems. Conversely, CFD models do not account for sophisticated boundary conditions, e.g. ambient weather (solar radiation), air handlers (fan), heat exchangers (evaporators), and vapor compression systems models.

Due to the multi-scale, highly nonlinear and complex nature of dynamic characteristics, design of high energy-efficient heating, ventilating, and air-conditioning (HVAC) systems simulations is a challenging task.

In other methods, CFD is used for airflow dynamics and heat transfer prediction coupled with BES models to incorporate complex dynamic characteristics of phase-changing refrigerant flow, ambient weather considerations, solar radiation, wall heat loss, etc. However, such methods take into account only feedback control provided by the BES and they simply use CFD for simulation. Further, current co-simulation methods ignore airflow optimization and they utilize brute-force methods in case of optimization of building side. Therefore, there is a need for a system and a method that provide optimal design and control of the HVAC system.

SUMMARY

It is an object of some embodiments to provide a system and a method for controlling an operation heating, ventilating, and air-conditioning (HVAC) systems. Further, it is also an objective of some embodiments to achieve a target thermal state distribution and optimize performance of the HVAC system. Additionally, or alternatively, it is also an objective of some embodiments to determine one or more design variables for optimal designing of the HVAC system.

Some embodiments are based on an objective of changing states of actuators of the HVAC system to ensure thermal comfort of occupants of an environment which is to be conditioned. Examples of the states of the actuators include a speed of a compressor of the HVAC, positions of various valves, rotation position of air louvers directing exhaust air, and the like. To that end, an HVAC actuators based control is implemented that aims to determine states of HVAC actuators to meet set points desired by the occupants of the environment. The HVAC actuators based control determines the state of the HVAC actuators to meet the set points. Subsequently, air is outputted through inlets to the environment according to the determined state of the HAVC actuators that meet the set points. In the HVAC actuators based control, controlling the states of the HVAC actuators is the primary objective, while a thermal state of the outputted air is secondary and treated as a bypass product. The thermal state of the outputted air includes one or combination of temperature, velocity and humidity of the air outputted by the HVAC system to the environment. As the thermal state of outputted air is controlled by changing the state of the HAVC actuators, the thermal state of the outputted air may not be directly determined.

To that end, some embodiments reverse this framework by contemplating the thermal state of the outputted air as primary objective of control. At first, a thermal state of the outputted air resulting in reaching the desired set points is determined. Subsequently, the state of the HVAC actuators that results in the determined thermal state of the outputted air is determined. That is, the state of the HAVC actuators is determined for outputs of the HVAC system from the inlets, and not for the set points.

To that end, some embodiments are based on a realization that the thermal state of the outputted air can be used as boundary conditions to estimate thermal state distribution in the conditioned environment. The air flow dynamics model (ADM) can be used to estimate the thermal state distribution subject to the boundary conditions. The ADM represents the dynamics of the air in the environment using Navier-Stokes equations and energy equations, wherein a computational fluid dynamics (CFD) calculation is utilized to solve the Navier-Stokes equations and the energy equations to estimate the distribution of thermal state. The boundary conditions are defined by two aspects, one is building envelope model (BEM) which uses information such dimensions of building/space, construction materials, lighting, and the like, and other one is the outputs from the HVAC system such as inlet air velocity, direction, humidity and temperature. Given the ADM, BEM and the boundary conditions, the thermal state distribution can be estimated using computational fluid dynamics (CFD) calculations. However, different boundary conditions can result in the same thermal state distribution.

To that end, some embodiments are based on a realization that a boundary condition related to the outputs of the HVAC system can be estimated that can achieve a desired thermal state distribution and, also, optimize performance of the HVAC system. Therefore, the boundary condition governed by the outputs of the HVAC system is utilized as control parameter, to optimize the performance of the HVAC system, as opposed to using it as input.

To that end, some embodiments are based on an objective of estimating values of boundary conditions that define target thermal state at the inlet locations which results in the desired thermal state distribution in the environment and, also, optimize the performance of the HVAC system to achieve that target thermal state at the inlet locations.

A relationship connecting operations of the HVAC system to the airflow dynamics and parameters to be optimized is established using a model of the HVAC system to achieve the above relationship. To that end, some embodiments use an HVAC model, which is given by structure of the HVAC system, to achieve the aforesaid relationship. The HVAC model can be used to estimate the outputs from the HVAC system such as inlet air velocity, direction, humidity and temperature. The estimated outputs from the HVAC system can be used as boundary conditions to the ADM, thereby, connecting the ADM and the HVAC model.

To that end, some embodiments are based on recognition that both the HVAC model and the building envelope model (BEM) define the boundary conditions for the ADM. For example, the HVAC model provides the ADM with the outputs from the HVAC system, whereas the building envelope model (BEM) provides temperature boundary condition for all surfaces and/or the boundary conditions for thermal state of the air at walls of the environment when the environment is not conditioned by the HVAC system. Thereby, given these boundary conditions and appropriate initial conditions, the ADM provides estimation of the target thermal state at the inlet locations that results in the desired thermal state distribution in the environment. In such a manner, the operations of the HVAC system can be connected to the desired thermal state distribution in the environment, and the performance of the HVAC system is optimized while achieving the desired thermal distribution in the environment. In some embodiments, optimizing the performance of the HVAC system includes optimizing energy consumption of the HVAC system.

The ADM can be used to determine the distribution of the thermal state in the room given the boundary conditions. However, some embodiments inverse the ADM to estimate values of the boundary conditions for the inlet locations defining target thermal state at the inlet locations that result in the target distribution of thermal state in the environment. Further, using the HVAC model, target control parameters of actuators of the HVAC system corresponding to the target distribution of thermal state in the environment are determined. Subsequently, control commands are generated corresponding to the target control parameters and submitted to the HVAC system. In particular, the control commands are submitted to a controller of the HVAC system to operate the actuators and/or components of the HVAC system according to the target control parameters.

Some embodiments are based on a realization that different combinations of values of the target thermal state at the inlet locations result in the target distribution of the thermal state in the environment. To that end, some embodiments are based on an objective of selecting a combination of the thermal state based on a metric of performance of the HVAC system. The metric of performance of the HVAC system is defined by a multi-objective cost function. The multi-objective cost function is a combination of a cost of operation of the HVAC system and a difference between the target thermal state distribution and a corresponding current thermal state distribution. Minimization of the multi-objective cost function includes iteratively minimizing the multi-objective cost function until a termination condition is met.

According to some embodiments, each iteration of the above iterative minimization includes determining a sensitivity of the cost function to an update of the boundary conditions for the inlet locations. The boundary conditions are updated in a direction of the sensitivity of the multi-objective cost function. Further, the current distribution of the thermal state according to the ADM with the updated boundary conditions are determined and, subsequently, the cost of operation of the HVAC system resulting in the updated boundary conditions at the inlet locations is determined. For example, the termination condition for the above iterative minimization is met when the sensitivity of the multi-objective cost function is less than a first threshold, a value of the cost function is less than a second threshold, or a number of iterations is greater than a third threshold.

Some embodiments are based on recognition that optimizing the performance of the HVAC system includes optimizing one or more design variables. The one or more design variables comprise HVAC system design variables and environment design variables, wherein the HVAC system design variables comprise number of inlets, inlet locations at the wall of the environment, size of air-conditioner (AC) diffuser and number of AC units, and wherein the environment design variables comprise thickness of the walls of the environment, material of the wall insulation, material of the window insulation and window shading.

Additionally, some embodiments are based on recognition that the one or more design variables can be optimized by iteratively minimizing the multi-objective cost function. According to some embodiments, each iteration of the above iterative minimization includes determining a sensitivity of the multi-objective cost function to an update of the one or more design variables. The one or more design variables are updated in a direction of the sensitivity of the multi-objective cost function. Further, the current distribution of the thermal state according to the ADM with the updated one or more design variables is determined and, subsequently, the cost of operation of the HVAC system resulting in the updated one or more design variables is determined. This iterative minimization is terminated when the termination condition is met.

Accordingly, one embodiment discloses a control system for controlling an operation of a heating ventilation and air conditioning (HVAC) system configured to condition an indoor environment by pushing air to the environment through a set of inlets arranged at a set of locations on one or multiple walls of the environment, wherein a thermal state of the air pushed to the environment at an inlet location includes one or combination of a temperature, a velocity and a humidity of the air, the control system comprising: an input interface configured to accept data indicative of a target distribution of thermal state in the environment, wherein a thermal state at a location in the environment includes one or combination of a temperature, a velocity, and humidity of the air; a memory configured to store an airflow dynamics model (ADM) defining a distribution of a thermal state in the environment subject to boundary conditions for thermal state of the air at the walls of the environment; and an HVAC model defining dynamics of the HVAC system; a processor configured to inverse the ADM to estimate values of the boundary conditions for the inlet locations defining target thermal state at the inlet locations that result in the target distribution of thermal state in the environment; determine, using the HVAC model, target control parameters of actuators of the HVAC system resulting in the target thermal state at the inlet locations; and submit control commands to the HVAC system to operate the actuators of the HVAC system according to the control parameters.

Accordingly, another embodiment discloses a method for controlling an operation of a heating ventilation and air conditioning (HVAC) system configured to condition an indoor environment by pushing air to the environment through a set of inlets arranged at a set of locations on one or multiple walls of the environment, wherein a thermal state of the air pushed to the environment at an inlet location includes one or combination of a temperature, a velocity and a humidity of the air, the control system, wherein the method uses a processor coupled to a memory storing an airflow dynamics model (ADM) defining a distribution of a thermal state in the environment subject to boundary conditions for thermal state of the air at the walls of the environment; and an HVAC model defining dynamics of the HVAC system, the processor is coupled with stored instructions when executed by the processor carry out steps of the method, comprising: accepting data indicative of a target distribution of thermal state in the environment, wherein a thermal state at a location in the environment includes one or combination of a temperature, a velocity, and humidity of the air; inversing the ADM to estimate values of the boundary conditions for the inlet locations defining target thermal state at the inlet locations that result in the target distribution of thermal state in the environment; determining, using the HVAC model, target control parameters of actuators of the HVAC system resulting in the target thermal state at the inlet locations; and submitting control commands to the HVAC system to operate the actuators of the HVAC system according to the control parameters.

DEFINITIONS

In describing embodiments of the invention, the following definitions are applicable throughout (including above).

A "vapor compression system" refers to a system that uses the vapor compression cycle to move refrigerant through components of the system based on principles of thermodynamics, fluid mechanics, and/or heat transfer. The vapor compression systems can be, but are not limited to, a heat pump, refrigeration, and an air-conditioner system. Vapor compression systems are used in applications beyond the conditioning of residential or commercial spaces. For example, vapor compression cycles can be used to cool computer chips in high-performance computing applications.

A "radiant system" refers to a system that supplies heat directly to the building materials such as the concrete floor, and heats the space and occupants mainly through radiant heat transfer. The radiant system uses a medium of heat transfer such as hot or cold water that runs through pipes that are embedded in the building material, but could also use electrical heating wires or heat exchangers connected to a vapor compression machine.

An "HVAC" system refers to any building heating, ventilating, and air-conditioning (HVAC) system implementing the vapor compression cycle. HVAC systems span a broad set of systems, ranging from systems which supply only outdoor air to the occupants of a building, to systems which only control the temperature of a building, to systems which control the temperature and humidity.

"Components of a vapor compression system" refer to any components of the vapor compression system having an operation controllable by the control systems. The components include, but are not limited to, a compressor having a variable speed for compressing and pumping the refrigerant through the system; an expansion valve for providing a pressure drop between the high-pressure and the low-pressure portions of the system, and an evaporating heat exchanger and a condensing heat exchanger.

An "evaporator" refers to a heat exchanger in the vapor compression system in which the refrigerant passing through the heat exchanger evaporates over the length of the heat exchanger, so that a specific enthalpy of the refrigerant at the outlet of the heat exchanger is higher than a specific enthalpy of the refrigerant at the inlet of the heat exchanger, and the refrigerant generally changes from a liquid to a gas. There may be one or more evaporators in the vapor compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor compression system.

An "air vent" refers to an edge point of a system of passages used in heating, ventilation, and air conditioning (HVAC) to deliver and remove air from the conditioned environment. As such, the air vents are used for ensuring acceptable indoor air quality as well as thermal comfort. The thermal state at the air vent may include one or combination of temperature, velocity and humidity of the air outputted by the HVAC system to the environment.

An "electrical circuit" refers to a closed path that interconnects electrical signals among components, such as processors, memory, or actuators.

A "set-point" refers to a desired value of a variable, such as the building space temperature. The term set-point is applied to any particular value of a specific set of variables.

A "computer" refers to any apparatus that is capable of accepting a structured input, processing the structured input according to prescribed rules, and producing results of the processing as output. Examples of a computer include a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

A "controller," "control system," and/or "regulator" refer to a device or a set of devices to manage, command, direct or regulate the behavior of other devices or systems. The controller can be implemented by hardware, a processor with operation configured by the software, and combination thereof. The controller can be an embedded system.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
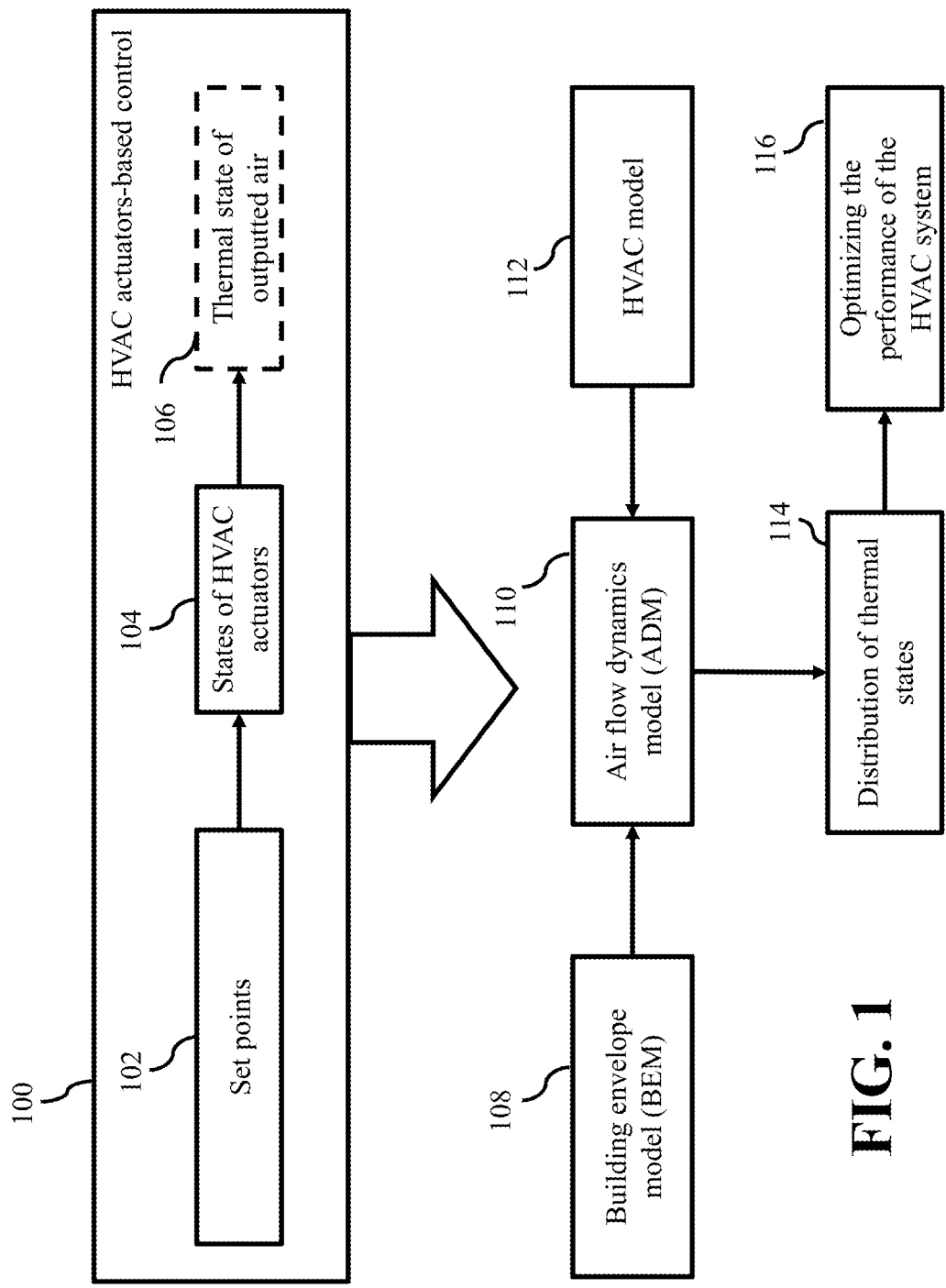
FIG. 1 shows a schematic overview of principles used by some embodiments to control a heating, ventilation and air conditioning (HVAC) system.

FIG. 1 shows a schematic overview of principles used by some embodiments to control a heating, ventilation and air conditioning (HVAC) system. The embodiments are based on recognition that objective of the HVAC control is to change states of actuators of the HVAC system to ensure thermal comfort of occupants of an environment which is to be conditioned. Examples of the states of the actuators include a speed of a compressor of the HVAC, positions of various valves, rotation position of air louvers directing exhaust air, and the like. To that end, HVAC actuators based control 100 aims to determine states of HVAC actuators 104 to meet set points 102 desired by the occupants of the environment. The HVAC actuators based control 100 determines the state of HVAC actuators 104 to meet the set points 102. Subsequently, air is outputted, through inlets, to the environment according to the determined state of HAVC actuators 104 that meet the set points 102.

In the HVAC actuators based control 100, the states of HVAC actuators 104 is the primary objective of control, while thermal state of outputted air 106 is secondary and treated as a bypass product. The thermal state of outputted air 106 includes one or combination of temperature, velocity and humidity of the air outputted by the HVAC system to the environment. As the thermal state of outputted air 106 is controlled by changing the states of HAVC actuators 104, the thermal state of outputted air may not be directly determined.

Some embodiments reverse this framework by contemplating the thermal state of outputted air 106 as a primary objective of control. At first, a thermal state of outputted air (i.e. the thermal state of outputted air 106) resulting in reaching the desired set points is determined. Subsequently, the states of HVAC actuators 104 that result in the determined thermal state of outputted air are determined. That is, the states of HAVC actuators 104 are determined for outputs of HVAC system from the inlets, and not for the set points.

Such a transformation simplifies internal control of the HVAC actuators and allows moving significant portion of the HVAC control from domain of dynamics of the HVAC actuators to domain of air flow dynamics. To that end, some embodiments use the thermal state of outputted air 106 as boundary conditions to estimate thermal state distribution in the conditioned environment. An air flow dynamics model (ADM) 110 can be used to estimate the thermal state distribution (i.e. distribution of thermal state 114 in FIG. 1) subject to the boundary conditions. The boundary conditions are defined by two aspects, one is via building envelope model (BEM) 108 which uses information such dimensions of building/space, construction materials, lighting, and the like, and other one is the outputs from the HVAC system such as inlet air velocity, direction, humidity and temperature. Given the ADM 110, BEM 108 and boundary conditions, the thermal state distribution can be estimated using computational fluid dynamics (CFD) calculations. In other words, some boundary conditions are independent (at least not directly) from the operation of HVAC system, while other boundary conditions are directly dependent on the operation of the HVAC system. Examples of HVAC independent boundary conditions include geometry of the conditioned room, heat exchange through walls of the room, etc. Examples of HVAC dependent boundary conditions include thermal state of the air pushed in the room through the inlets by the HVAC system. Knowing all boundary conditions, it is possible to determine distribution of the thermal state in the room using ADM.

Notably, different combination boundary conditions can result in the same thermal state distribution. To that end, some embodiments are based on a realization that a boundary condition related to the outputs of HVAC can be estimated to achieve a desired thermal state distribution and, also, optimize performance of HVAC system. Therefore, the boundary condition is utilized as a control parameter, to optimize the performance of the HVAC system, as opposed to using it as input.

To that end, some embodiments are based on an objective of estimating values of boundary conditions that define target thermal state at the inlet locations which results in the desired thermal state distribution in the environment and, also, optimizes the performance of the HVAC system. To achieve this objective, a relationship connecting operations of the HVAC system to the airflow dynamics and parameters to be optimized is established using a model of the HVAC system.

To that end, some embodiments use an HVAC model 112, which is given by structure of the HVAC system, to achieve the aforesaid relationship. The HVAC model 112 can be used to estimate the outputs from the HVAC system such as inlet air velocity, direction, humidity and temperature. The estimated outputs from the HVAC system can be used as boundary conditions to the ADM 110, thereby, connecting the ADM 110 and the HVAC model 112.

According to some embodiments, both the HVAC model 112 and the building envelope model (BEM) 110 define the boundary conditions for the ADM 110. For example, the HVAC model 112 provides the ADM 110 with the outputs from the HVAC system, whereas the building envelope model (BEM) provides temperature boundary condition for all the surfaces and/or the boundary conditions for thermal state of the air at walls of the environment when the environment is not conditioned by the HVAC system. Thereby, given these boundary conditions and appropriate initial conditions, the ADM 110 provides estimation of the target thermal state at the inlet locations that results in the desired thermal state distribution in the environment. In such a manner, the operations of the HVAC system can be connected to the desired thermal state distribution in the environment, and the performance of the HVAC system is optimized 116 while achieving the desired thermal distribution in the environment. In some embodiments, optimizing the performance of the HVAC system 116 includes optimizing energy consumption of the HVAC system. In some other embodiments, optimizing the performance of the HVAC system 116 includes optimizing design parameters, such as number of inlets, inlet locations at walls of the environment, size of air-conditioner (AC) diffuser, number of AC units and the like. Some embodiments are based on a realization that the performance of the HVAC system 116 can be optimized by iteratively minimizing a cost function which is combination of a cost of operation of the HVAC system and a difference between the desired thermal state distribution and a current thermal state distribution.

System Overview

Figure 2:
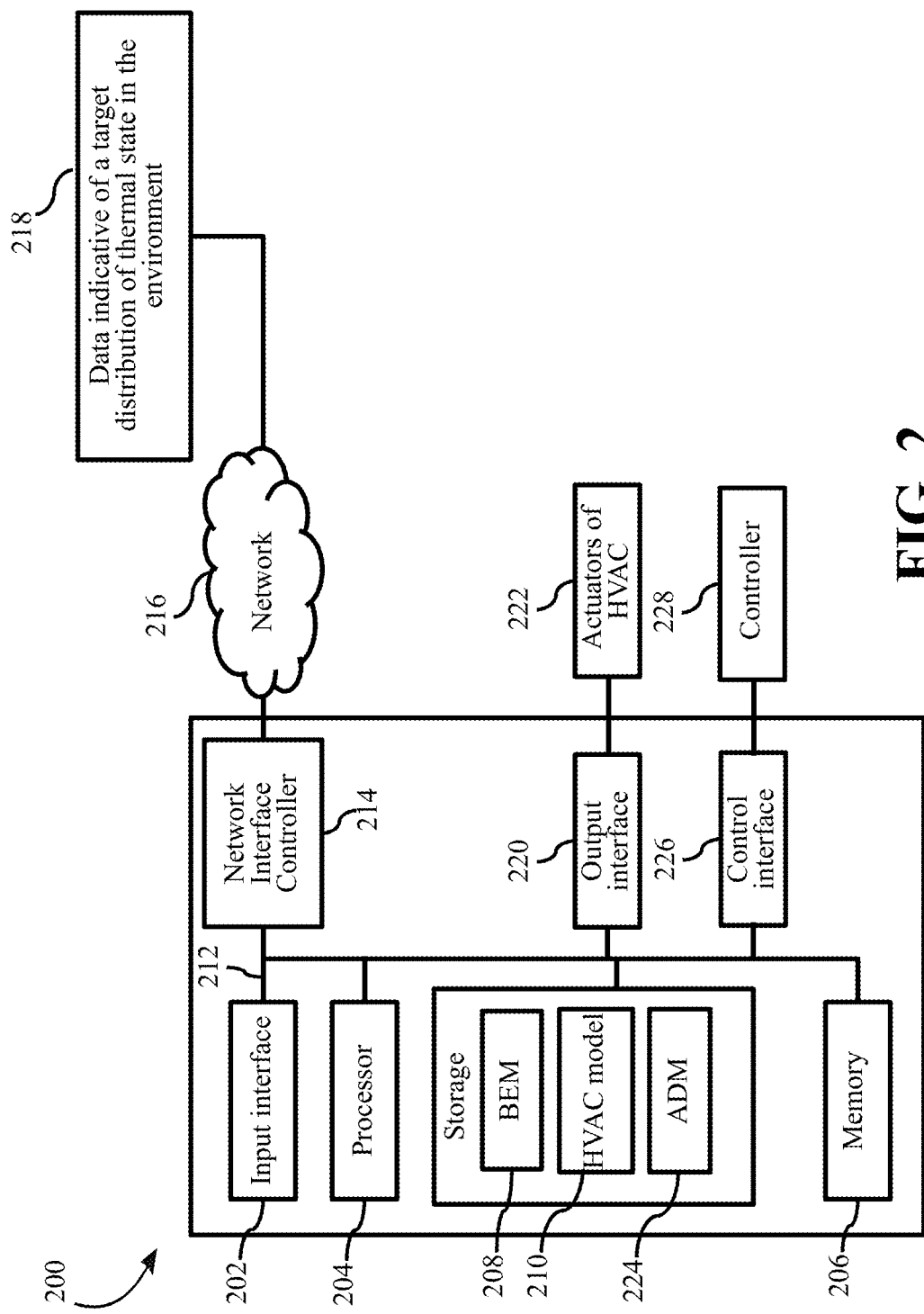
FIG. 2 shows a block diagram of a system for controlling and optimizing the performance of a heating ventilation and air conditioning (HVAC) system, according to some embodiments.

FIG. 2 shows a block diagram of a system 200 for controlling and optimizing the performance of a heating ventilation and air conditioning (HVAC) system, according to some embodiments. The HVAC system is configured to an environment by pushing air to the environment through a set of inlets arranged at a set of locations on one or multiple walls of the environment. The environment may be a room or space of a building, or the whole building where the HVAC system is installed. In some embodiments, the environment may correspond to space of the building where occupants are located or reside. A thermal state of the air pushed to the environment at an inlet location includes one or combination of a temperature, a velocity and a humidity of the air.

The system 200 can have a number of interfaces connecting the system 200 with other systems and devices. For example, a network interface controller (NIC) 214 is adapted to connect the system 200, through a bus 212, to a network 216 connecting the system 200 with the operatively connected to a set of sensors. Through the network 216, either wirelessly or through wires, the system 200 receives data indicative of a target distribution of thermal state in the environment 218. Additionally, the system 200 includes a control interface 226 configured to submit control commands to a controller 228 of the HVAC system to operate the actuators of the HVAC system 222.

The system 200 includes an input interface 202 configured to accept the data indicative of a target distribution of thermal state in the environment. In some embodiments, the target distribution of thermal state is received for a section of the environment, which is referred to as a target region in the environment. In such cases, the target region is maintained according to the target distribution of thermal state and remaining region of the environment is maintained at different thermal state distribution. Therefore, in these cases, the HVAC system conditions the environment which results in uneven distribution having at least two different values of thermal state at two different locations in the environment. In some other embodiments, the target distribution of thermal state is provided for the entire environment. In such cases, an even thermal state distribution having same thermal state at each location in the environment is produced. In another embodiment, the input interface 202 configured to obtain environmental data indicative of geometry of the environment and energy exchange. The environmental data is indicative of the energy exchange is based on one or more of wall insulation, window insulation, average outside temperature, or solar radiation at the walls of the environment.

The system 200 includes a processor 204 configured to execute stored instructions, as well as a memory 206 that stores instructions that are executable by the processor 204. The processor 204 can be a single core processor, a multi-core processor, a computing cluster, or any number of other configurations. The memory 206 can include random access memory (RAM), read only memory (ROM), flash memory, or any other suitable memory systems. The processor 204 is connected through the bus 212 to one or more input and output devices.

Further, the system 200 includes a building envelope model (BEM) 208, heating ventilation and air conditioning (HVAC) model 210, and an air flow dynamics model (ADM) 224. The aforementioned models are executed by the processor 204.

According to some embodiments, the BEM 208 provides, based on the environmental data, boundary conditions for thermal state of the air at the walls of the environment when the environment is not conditioned by the HVAC system. The processor 204 initializes the boundary conditions by submitting values of thermal state outside of the environment to the BEM 208. In some embodiments, the BEM 208 uses information such as dimensions of building/environment, construction materials, lighting, and the like to define the boundary conditions for thermal state of the air at the walls of the environment. The BEM 208 is explained in detail with reference to FIG. 3.

In some embodiments, the HVAC model 210 defines dynamics of the HVAC system. The HVAC model 210 can be used to estimate the outputs from the HVAC system such as inlet air velocity, direction, humidity and temperature. Further, the estimated outputs from the HVAC system are fed as boundary conditions to the ADM 224. The ADM 224 defines a distribution of a thermal state subject to boundary conditions for thermal state of the air at the walls of the environment. In some embodiments, the ADM 224 represents the dynamics of the air in the environment using Navier-Stokes equations and energy equations. Further, a computational fluid dynamics (CFD) calculation is utilized to solve the Navier-Stokes equations and the energy equations to estimate the distribution of thermal state.

In order to facilitate data exchange between the aforesaid models (208, 210, and 224), one embodiment defines a fixed synchronization time step for data exchange. Additionally, or alternatively, according to some embodiments, the synchronization time step is greater than integration time steps of the respective models, which can be either fixed or adaptive. A quasi-dynamic data synchronization scheme is used in the coupled simulation, i.e., programs only exchange data between each other at synchronization and retain their received data unchanged between synchronizations.

In some other embodiments, the processor 204 is configured to inverse the ADM 224 to estimate values of the boundary conditions for the inlet locations defining target thermal state at the inlet locations that result in the target distribution of thermal state in the environment. Different combinations of values of target thermal state at the inlet locations result in the target distribution of thermal state in the environment. To that end, the processor 204 is configured to select a combination of thermal state based on a metric of performance of the HVAC system. The metric of performance of the HVAC system is defined by a multi-objective cost function. The multi-objective cost function is a combination of a cost of operation of the HVAC system and a difference between the target thermal state distribution and a corresponding current thermal state distribution. The multi-objective cost function is iteratively minimized, by the processor 204, until a termination condition is met.

In some other embodiments, the processor 204 is configured to determine design variables by minimizing the multi-objective cost function. The design variables include HVAC system design variables and environment design variables. The HVAC system design variables comprise the number of inlets, the inlet locations at the wall of the environment, the size of air-conditioner (AC) diffuser and the number of AC units. According to some embodiments, the environment design variables comprise thickness of the walls of the environment, material of the wall insulation, material of the window insulation and window shading.

Further, the system 200 includes an output interface 220 configured to output the one or more design variables. In some embodiments, the output interface 220 is configured to submit control commands to the HVAC system.

Figure 3:
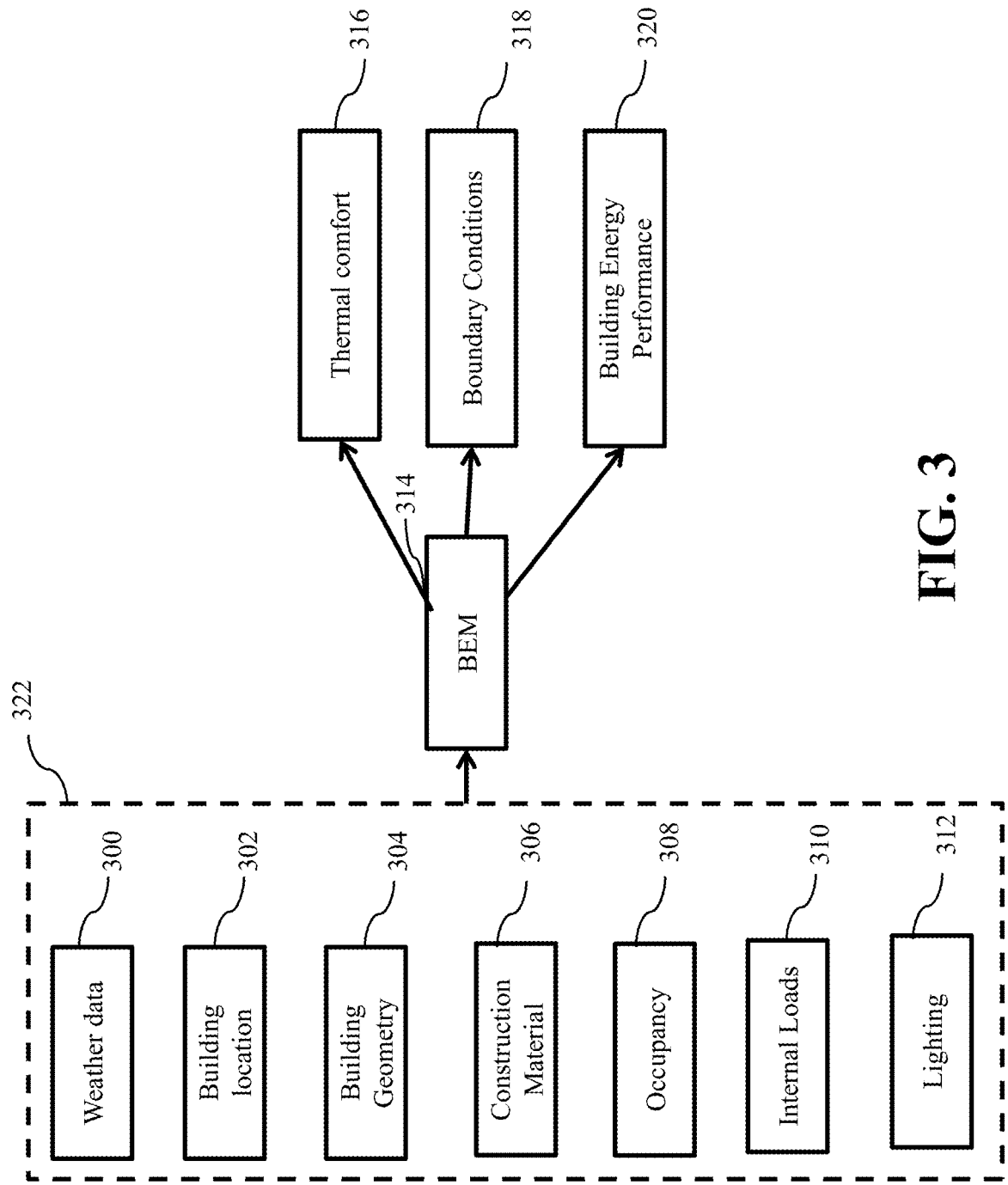
FIG. 3 shows a block diagram of inputs and outputs of a building envelope model (BEM), according to some embodiments.

FIG. 3 shows a block diagram of inputs and outputs of the building envelope model (BEM) 314, according to some embodiments. A building includes walls, windows, roof and so on, which play a key role in determining levels of comfort. Different information, such as weather data 300, building location 302, building geometry 304, construction material of the building 306, occupancy 308, internal loads 310, and lighting 312 are given as inputs 322 to the BEM 314. The weather data 300 may be obtained from a meteorological agency such as national weather service in the USA. The weather data 300 provides temperature and humidity of outside air, type of weather, and the like. The inputs 322 influence the energy consumption of the HVAC system.

To that end, in some embodiments, the BEM 314 uses the inputs 322 to determine building energy consumption 320. Further, in some embodiments, the building envelope model 314 uses the weather data 300 and the location of the building 302 to calculate thermal loads and resulting energy consumption as well as thermal comfort 316, based on first-principles equations.

Since the building envelope model 314 is used for assessment of the thermal performance of the buildings over a course of an entire year, the building envelope model 314 is not integrated with CFD simulation. For the BEM, the conditioned environment is sometimes assumed to be well-mixed and non-uniform distributions of velocity, temperature, pressure and concentration are neglected in order to speed up the CFD simulation. To that end, some embodiments are based on objective of coupling the building envelope model 314 and the CFD simulation. In some embodiments, the building envelope model 314 provides boundary conditions 318 to the CFD, whereas the CFD simulates the airflow dynamics in the environment, based on the provided boundary condition 318. Further, the CFD sends average airflow and heat transfer information back to the building envelope model 314 such that a closed-loop analysis is accomplished.

Figure 4:
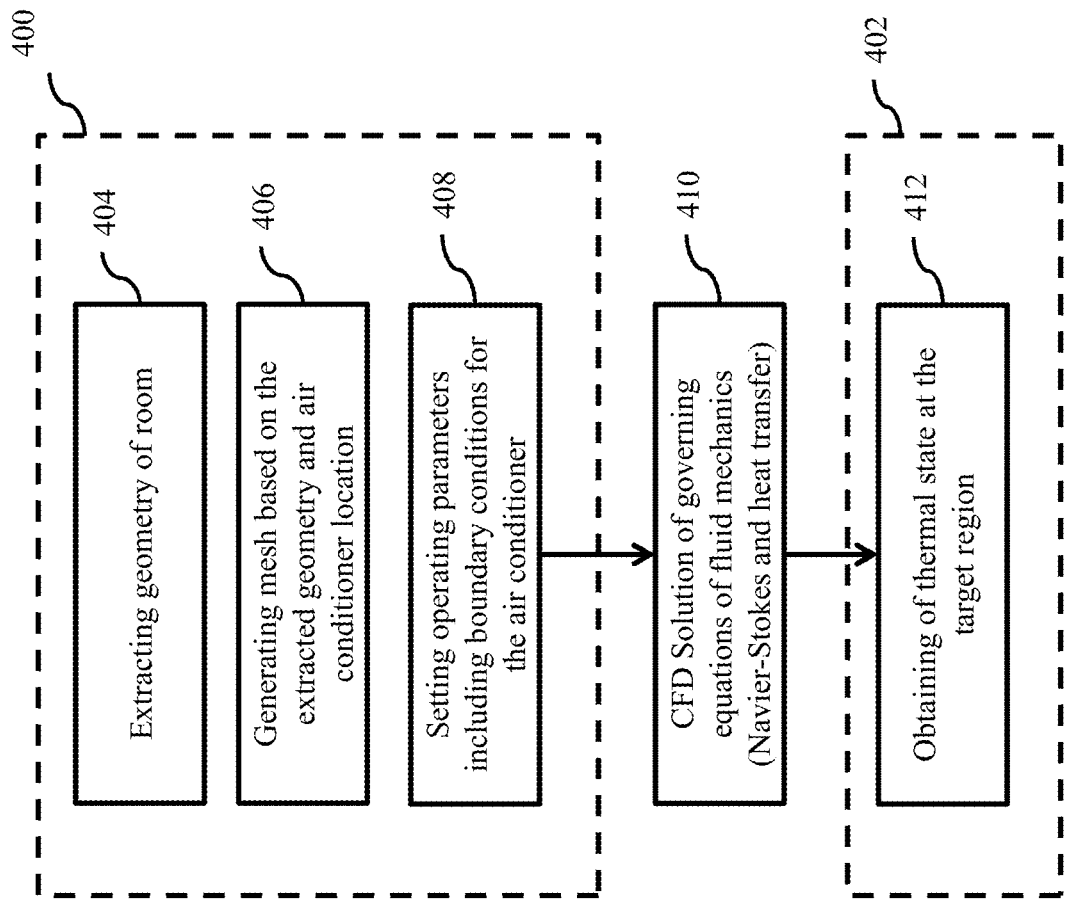
FIG. 4 shows a schematic of preprocessing and post processing involved in computational fluid dynamics (CFD) simulations to obtain thermal state at a target region, according to some embodiments.

FIG. 4 shows a schematic of preprocessing 400 and post processing 402 involved in the computational fluid dynamics (CFD) simulations to obtain the thermal state at the target region, according to some embodiments. The CFD is a branch of fluid mechanics that uses numerical analysis and data structures to solve and analyze equations related to fluid flows. A mathematical model of a physical case and a numerical method are used in a software tool, such as the CFD, to analyse the fluid flow. For instance, the Navier-Stokes equations are specified as the mathematical model of the physical case. This describes changes on physical properties for both fluid flow and heat transfer. Here the fluid may be air. The mathematical model varies in accordance with the content of the problem such as heat transfer, mass transfer, phase change, chemical reaction, and the like. Here, a room is referred to as the environment in which the occupant is located. The preprocessing 400 step comprises defining geometry and physical bounds of problem using computer aided design (CAD) and, consequently, extracting geometry of the room 404. Further, a mesh may be generated based on the extracted geometry 406 and operating parameters including boundary conditions may be set for air conditioner 408. The air conditioner may correspond to the HVAC system. The post processing 402 includes obtaining the thermal state at the target region 412 based on the preprocessing step 400 and a CFD solution of governing equations of fluid mechanics 410.

In some embodiments, the geometry may be architecture of the room and may, for example, be extracted from blueprints of the building of the room. Further, volume occupied by fluid in the room is determined. Post extracting the geometry of the room, the mesh is generated based on the extracted geometry and the air conditioner location 406. In some embodiments, the extracted geometry is divided into discrete cells (i.e. the mesh).

The mesh may be uniform or non-uniform, structured or unstructured, consisting of a combination of hexahedral, tetrahedral, prismatic, pyramidal or polyhedral elements. The optimal number of mesh points in the domain is selected such that the important flow structures, e.g. circulations in the room, buoyant ascending or descending flow structure in vicinity of the air conditioner or occupant, etc. are captured in the mesh with high resolution. For example, the mesh points around the inlet can be increased to better capture the dynamics of high velocity in vicinity of the inlet. Other examples include increasing the number of elements in vicinity of heat loads, occupants or outlet. An optimal mesh is obtained by mesh sensitivity analysis. To perform mesh sensitivity analysis, systematically increase the number of nodes, say by doubling the number elements is needed. For each mesh, a value of interest is monitored. The optimal mesh is the one after which by increasing the number of mesh points the value of interest does not alter. For architectural fluid mechanics applications, such values of interest can be the average of temperature in the target region, heat transfer through the wall, average temperature at the outlet, etc.

Further, in the preprocessing 400, other physical information required for the CFD simulation and optimization are estimated by setting the operating parameters including boundary conditions for the air conditioner 408. This includes specifying fluid behavior and properties at all bounding surfaces of the room. Nominal conditions of the air conditioner may be used as the initial values for the air conditioner input in a form of boundary conditions. A boundary condition of a field (for example velocity, pressure) specifies the value of the function itself, or the value of the normal derivative of the function, or the form of a curve or a surface that gives a value to the normal derivative and the variable itself, or a relationship between the value of the function and the derivatives of the function at a given area. The boundary conditions for velocity at solid surfaces such as walls are set to zero. The boundary conditions for the temperature are based on the heat transfer between the room and its exterior. Such heat transfer depends on the thermophysical properties of walls of the room, e.g. conductivity of various layers used in the building envelope, thickness of each layer, and the exterior air temperature. The thermophysical properties of the fluid within the room, e.g. the density or thermal diffusivity, may be chosen based on appropriate thermal state model.

Further, the CFD may solve the governing equations of mechanics of the fluid 410. Here, the governing equations are Navier-Stokes equations. The CFD solves the Navier-Stokes equation along with mass and energy conservation. The set of equations, based on the Navier-Stokes equation, are proved to represent the mechanical behavior of a Newtonian fluid, such as air, and are implemented for simulations of flows within the environment or the room. Discretization of the Navier-Stokes equations is a reformulation of the equations in such a way that the Navier-Stokes equations may be applied to computational fluid dynamics. The governing equations, Navier-Stokes with heat transfer, are as follows:

$$\frac{\partial V}{\partial t} + V \cdot \nabla V + \frac{1}{\rho}\nabla p - \nabla \cdot (\nu \nabla V) = g\beta\Delta T \quad (1a)$$

-continued $$\nabla \cdot V = 0 \quad (1b)$$

$$\frac{\partial T}{\partial t} + V \cdot \nabla T - \nabla \cdot (\kappa \nabla T) = 0 \quad (1c)$$

where,
$\nabla \cdot$ is divergence operator,
$\nabla$ is gradient operator, and
$\nabla^2$ is Laplacian operator.
p, V, T are pressure, velocity and temperature distribution respectively.

Further, equations such as relative humidity $\psi$ can also be coupled to above equations.

The equations 1a-1c may be denoted as N(p, V, T, $\psi$)=0 and computation fluid dynamics (CFD) may be utilized to solve the equations 1a-1c to obtain the solution.

In the post-processing 402, from the solution of the equations 1a-1c, obtained by the CFD 410, the thermal state at the target region is obtained. Such thermal state includes the temperature, air velocity and humidity of air/fluid in the target region. Further, the obtained thermal state may be used to evaluate the target thermal state, and subsequently, boundary conditions for the air flow dynamics model is modified to achieve the target distribution of thermal state in the environment and minimize energy consumption of the air conditioner.

Figure 5:
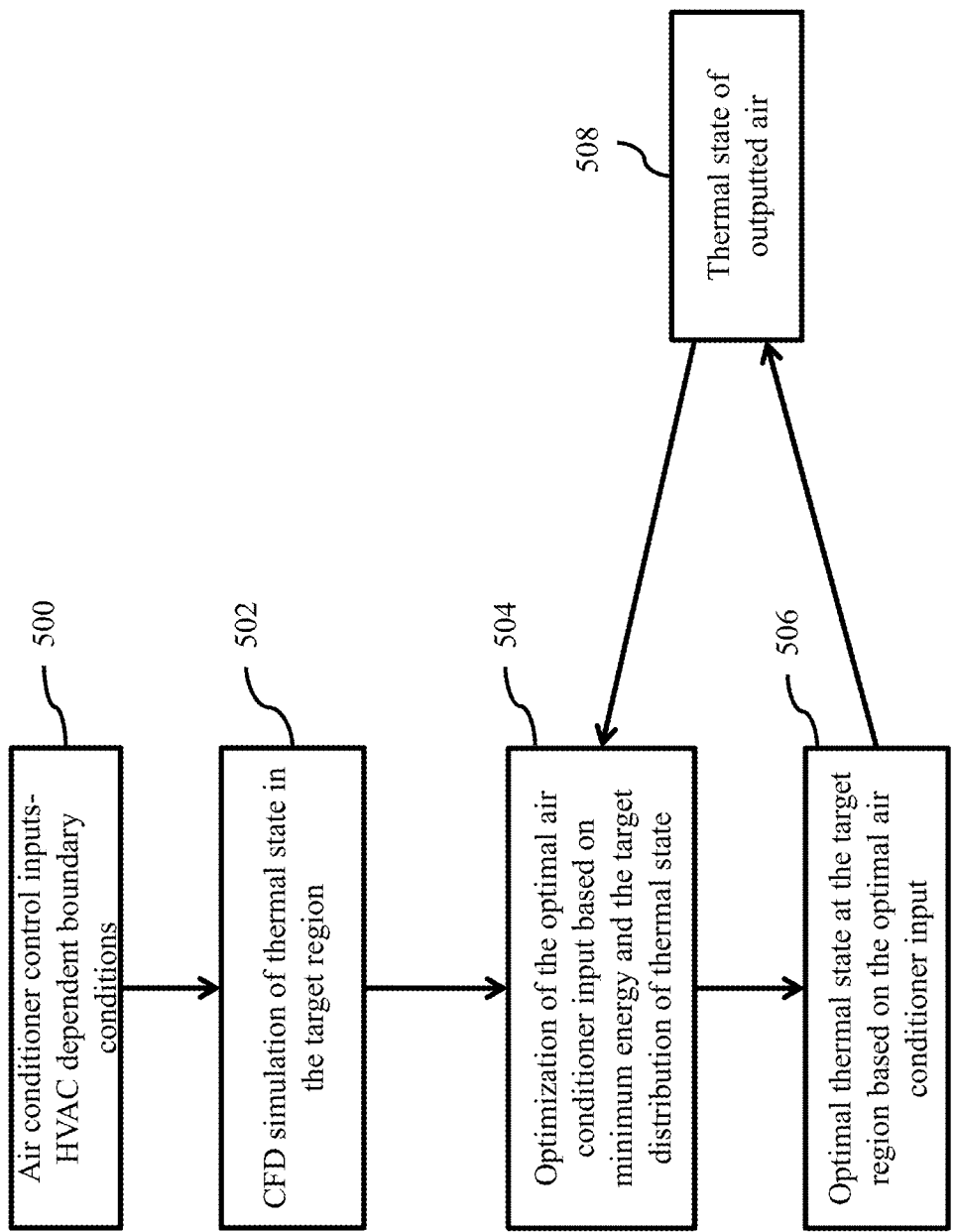
FIG. 5 shows a schematic for obtaining the thermal state at the target region based on CFD simulation and optimal air conditioner input, according to some embodiments.

FIG. 5 shows a schematic for obtaining the thermal state at the target region based on CFD simulation and optimal air conditioner input, according to some embodiments. Air conditioner control inputs 500 are, for example, the inlet temperature and velocity, the angle of the flow direction, the humidity of the air conditioner flow, and the like. In some embodiments, the air conditioner control inputs 500 are utilized as boundary conditions for the CFD simulations 502. The CFD simulation may yield the thermal state at the target region 502 (as described with reference to FIG. 4).

Further, the air conditioner inputs 500 are optimized. The optimization of air conditioner input 504 is based on based on minimum energy consumption of the HVAC system, and the target distribution of thermal state. In some embodiments, the optimization of air conditioner input 504 is based on the minimum energy consumption and the thermal state at the target region from the CFD simulation 502. Therefore, an optimal air conditioner input is one which provides the target distribution of thermal state in the target region with the minimal energy consumption of the HVAC system. Succeeding the CFD simulation 502 and the optimization of air conditioner input 504, optimal thermal state at the target region is determined 506. The optimal thermal state at the target region is determined based on the optimal values of air conditioner inputs obtained from the optimization 504. Further, the thermal state of outputted air is 508 is updated according to the determined optimal thermal state.

Some embodiments are based on a realization that in the event the CFD is used for the purpose of obtaining the thermal state in the target region, a particular cost function needs to be minimized to achieve the target thermal state in the target region with the minimal energy consumption.

Figure 6:
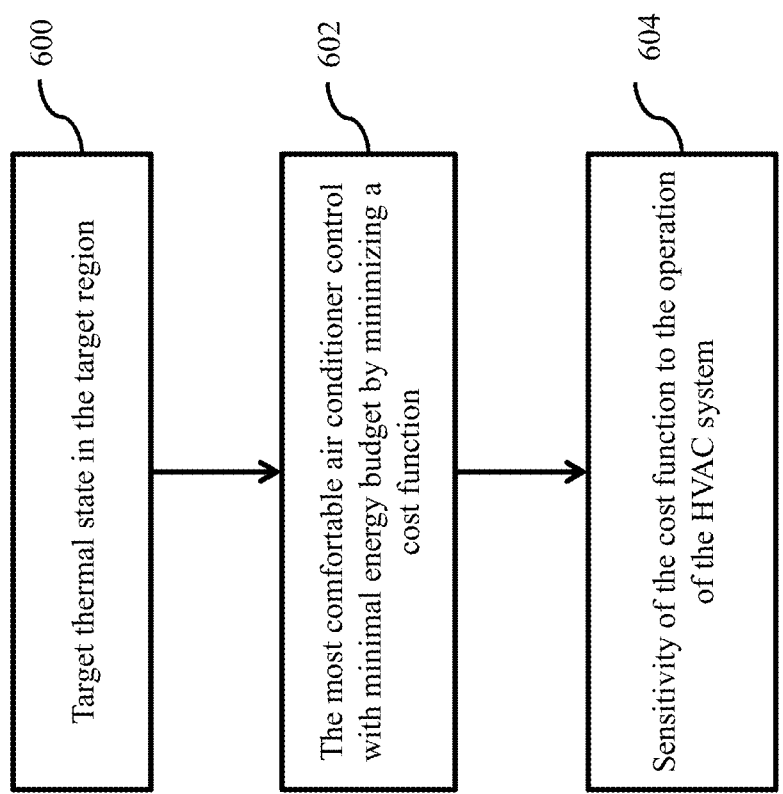
FIG. 6 shows a schematic of minimizing a cost function to obtain the target thermal state in the target region while improving energy efficiency of HVAC system, according to some embodiments.

FIG. 6 shows a schematic of minimizing a cost function to obtain the target thermal state in the target region while improving energy efficiency of HVAC system according to some embodiments. Some embodiments are based on a realization that there are a number of different combinations of outputs of the HVAC system that can lead to satisfaction of target thermal state 600. To that end, some embodiments aim to find not just any suitable output combination but the one that also minimizes energy consumption of the HVAC system. That is, among all output combination that can meet the target thermal state in the target region 600, the embodiments select one that requires minimum energy to implement. In some embodiments, this output combination is solved using an optimization of a cost function 602. For example, the optimization of the cost function can be performed iteratively 604 based on a sensitivity of the cost function to the operation of the HVAC system an exemplar sensitivity based optimization is a direct-adjoint-looping (DAL) method.

Some embodiments are based on a realization that the cost function can be evaluated based on well-mixed thermal state model in the room, which assumes the entire domain constitutes of a single temperature value. However, such realization in many cases is incorrect and over-simplified since thermal stratification is common in buildings. Buildings are complex, multi-scale in time and space, multi-physics and highly uncertain dynamic systems with wide varieties of disturbances. In the CFD analysis, the whole building is considered as an integrated system and the airflow dynamics are simulated efficiently.

Specifically, some embodiments are based on a realization that the thermal state in the environment affects the target thermal state in the target region as well the energy consumption of the air conditioner.

Figure 7A:
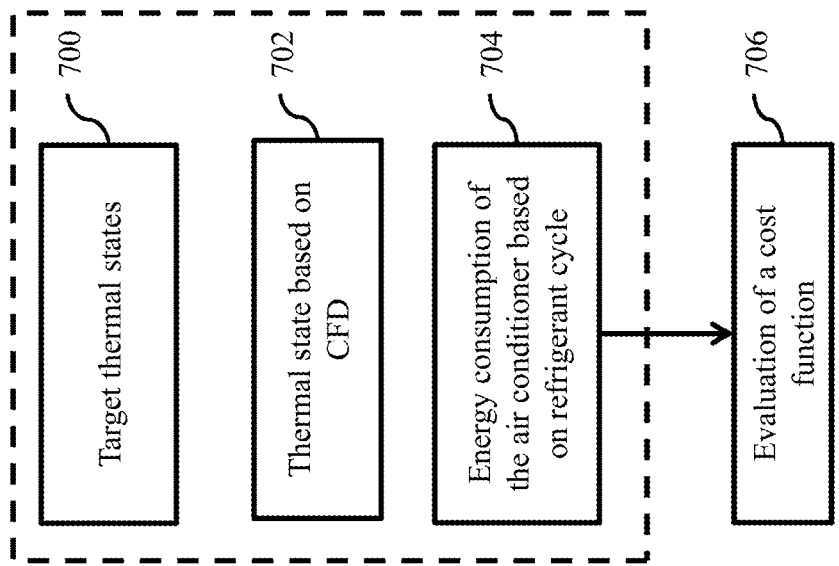
FIG. 7A shows a schematic of constructing and evaluating a cost function that includes both the target thermal state and energy consumption of the HVAC system, according to some embodiments.

FIG. 7A shows a schematic of constructing and evaluating a cost function that includes both the target thermal state and energy consumption of the HVAC system, according to some embodiments. A target thermal state 700 is obtained. Further, a thermal state based on the CFD simulation 702 is obtained. The cost function evaluation yields a numerical value representing how well the CFD simulation thermal state 702 matches with the target thermal state along the line of sight of different beams at various altitudes. Multiple thermal states may have different energy budget when the energy consumption of air conditioner based on a refrigerant cycle 704 is considered. For example, in some embodiments, the air conditioner control inputs may be determined with large values of fan speed in the refrigerant cycle to achieve the target thermal state, which may be suboptimal for the operation of HVAC system.

Figure 7B:
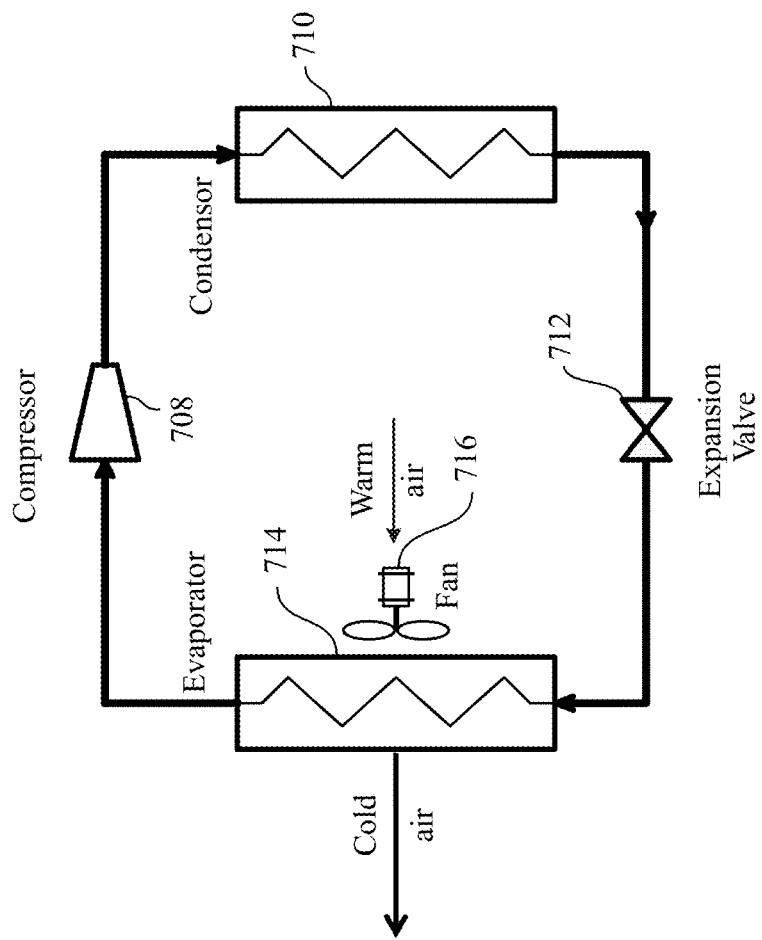
FIG. 7B shows a schematic of a vapor-compression cycle as an exemplar of the refrigerant cycle, according to some embodiments.

FIG. 7B shows a schematic of a vapor-compression cycle as an exemplar of the refrigerant cycle, according to some embodiments. Refrigeration cycles are the conceptual and mathematical models for heat pumps and refrigerators. An example of refrigerant cycle is vapor-compression cycle, which is used in most household refrigerators as well as in many large commercial and industrial refrigeration systems, with refrigerant as working fluid. A refrigerant is a substance or mixture, usually a fluid such as fluorocarbons that undergoes phase transitions from a liquid to a gas and back again in the vapor-compression cycle. The vapor-compression utilizes circulating liquid the refrigerant as the medium which absorbs and removes heat from the room to be cooled and subsequently rejects that heat elsewhere. All such systems have four components: a compressor 708, a condenser 710, a thermal expansion valve (also called a throttle valve or metering device) 712, and an evaporator 714. Also, a fan 716 circulates the warm air in enclosed space across the coil or tubes carrying the cold refrigerant liquid and vapor mixture. As a result of this, energy consumption is associated with the compressor 708, the condenser 710, the thermal expansion valve 712, and the evaporator 714. The evaluation of cost function 706 may consider such energy consumption in addition to the target thermal state.

In some embodiments, the multi-objective cost function J is defined as $$J = \iiiint_\Omega (T - T_{comf})^2 + (V - V_{comf})^2 + (\psi - \psi_{comf})^2 dxdydzdt \quad (2)$$

where, $T_{comf}, V_{comf}, \omega V_{comf}$ are determined from a thermal comfort model, which itself, uses T, V, $\psi$ of the thermal state for the training purpose. Here $\Omega$ is the region of the interest.

Figure 8A:
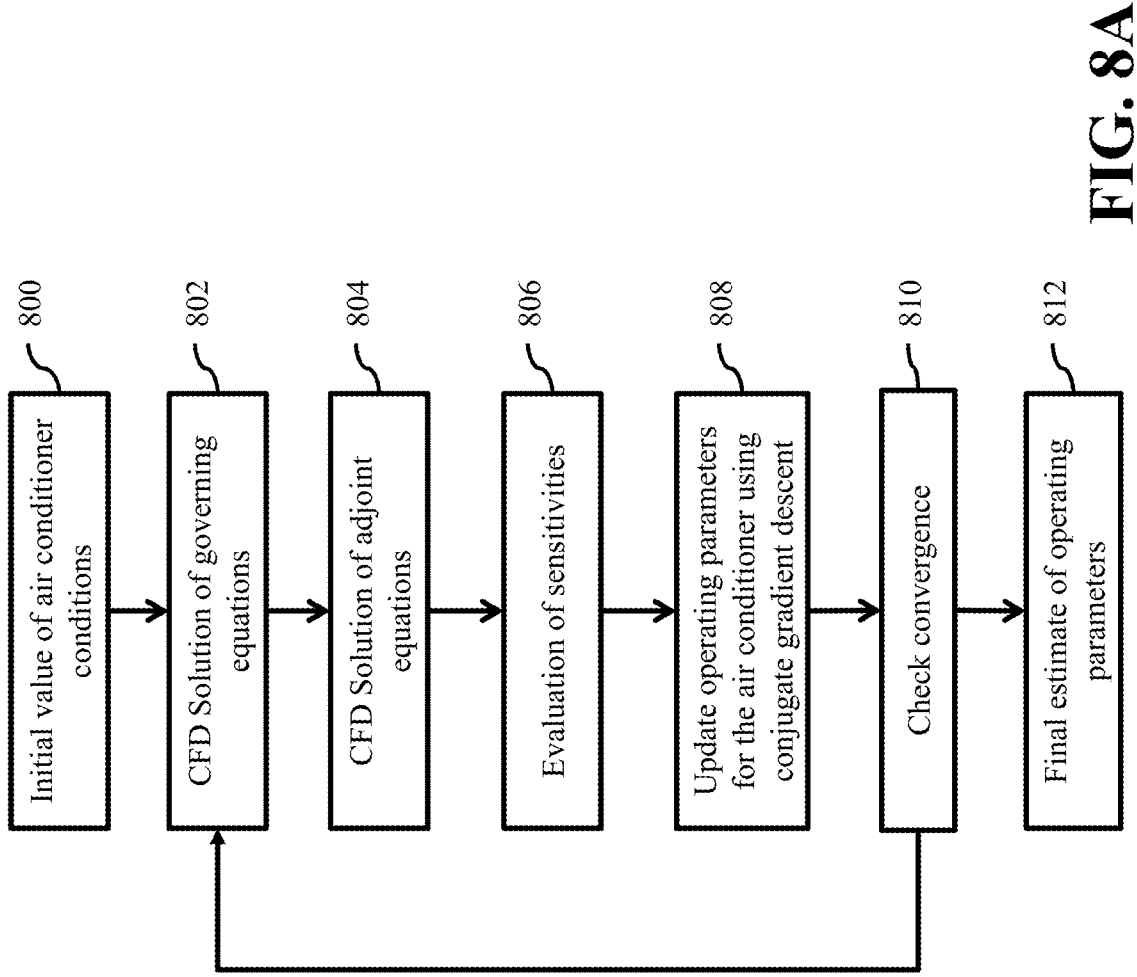
FIG. 8A shows a block diagram as an exemplary optimization method to implement the optimal air conditioner input in terms of the target thermal state with minimum energy, according to some embodiments.

FIG. 8A shows a block diagram as an exemplary optimization method to implement the optimal air conditioner input in terms of the target thermal state with minimum energy, according to some embodiments. Initial value of the air conditioner 800, which are served as boundary conditions for Navier-Stokes equations with heat transfer, are based on the nominal operating conditions of the refrigerant cycle. For example, the initial value can be derived from the current state of operation of the HVAC system. The initial value of the air conditioner 800 is utilized for CFD solution of governing equations 802. Further, CFD solution of adjoint equations 804 is determined. The CFD solution of adjoint equations 804 is utilized to evaluate sensitivity of cost function 806.

The adjoint Navier-Stokes and heat transfer problem is derived on the level of partial differential equations (PDE) first, based on Euler-Lagrange method to enforce the ADM 224. The aim is to minimize the cost function in presence of ADM 224 or any other suitable constraints. Other constraints may be geometry of the room, the maximum velocity that can be provided by HVAC system, the minimum or maximum temperature that can be provided by HVAC system, etc. In deriving the adjoint equations the frozen-turbulence assumption can be used, which neglects the variations of the turbulence field with respect to the cost function in the analysis. Second, likewise to regular CFD problems, the PDE equations are discretized in the computational domain with various numerical methods e.g. finite volume, finite element, finite difference, etc.

The sensitivity of cost function 806 is deemed as a gradient of the cost function. Further, a gradient descent method is applied to update operating parameters for the air conditioner 808. A convergence criterion is checked 810. An example of such convergence criterion is the variation of the cost function between successive iterations. Another example is the magnitude of the sensitivity or gradient of the cost function with respect to design variables. If the convergence criterion is not met, then next iteration is instigated in which a CFD solution of governing equations 802 is determined. The convergence criterion is satisfied in the event that the thermal state in the target region is equal or approximately equal to the target thermal state. In the event, the convergence criterion is satisfied, final estimation of operating parameters 812 for the air conditioner is carried out.

The sensitivity of cost function with respect to any operating parameter $\xi_i$ may be expressed as:

$$\frac{\delta J}{\delta \xi_i} = \frac{J(\xi_i + \delta \xi_i, \xi_1, \ldots, \xi_{i-1}, \xi_{i+1,\ldots}) - J(\xi_i - \delta \xi_i, \xi_1, \ldots, \xi_{i-1}, \xi_{i+1,\ldots})}{2\delta \xi_i} i \quad (3)$$

The set of operating parameters that needs to be estimated are denoted by $(\xi_1, \xi_2, \ldots \xi_n)$. Optimization method uses an augmented objective function L as $$L = J + \int_\Omega (p_a, V_a, T_a, \psi_a) N(P, V, T, \psi) d\Omega \quad (4)$$

$N(p, V, T, \psi) = 0$ are Navier-Stokes equations with heat transfer, and mass conservation.

Considering the variation of $\xi_i$, the variation of L can be expressed as $$\delta L = \frac{\delta L}{\delta \xi_i} d\xi_i + \frac{\delta L}{\delta V} dV + \frac{\delta L}{\delta p} dp \tag{5}$$

To determine $$\frac{\delta L}{\delta \xi_i},$$

the adjoint variables are chosen to satisfy the condition below:

$$\frac{\delta L}{\delta V} \delta V + \frac{\delta L}{\delta p} \delta p = 0.$$

Hence, Direct-Adjoint-Looping (DAL) method involves Lagrangian multipliers ($V_a$, $p_a$, $T_a$), which stands for adjoint velocity, and pressure, respectively, to make a $\partial J/\partial \xi_i$ computable. The air conditioner inputs to be determined by the optimization are chosen to be V, T, $\psi$, i.e. the inlet velocity, inlet angle, inlet temperature, and inlet humidity.

For example, to determine $\delta J/\delta V$ and $\delta J/\delta T$, optimization approach may be used by setting $\xi_i = V$ or $\xi_i = T$. Also, ($p_a$, $V_a$, $T_a$, $\psi_a$) are the adjoint pressure, velocity, temperature and humidity used in step 804. The adjoint variables may be regarded as purely mathematical terms. In some embodiments, the adjoint variables provide or signify the influence of an arbitrary source term on the functional of interest i.e., the Navier-Stokes equations with heat transfer.

The adjoint variables may be used to determine the sensitivity of cost function to any operating parameter $$\frac{\delta L}{\delta \xi_i} = \frac{\delta J}{\delta \xi_i} + \int_\Omega (p_a, V_a, T_a, \psi_a) \frac{\delta N(p, V, T_a, \psi_a)}{\delta \xi_i} d\Omega \tag{6}$$

By using simple steepest descent algorithm, $\xi_i$ may be updated as $$\xi_i^{new} = \xi_i^{old} - \lambda \frac{\delta J}{\delta \xi_i} \tag{7}$$

where $\lambda$ is a positive constant representing the step size.

Figure 8B:
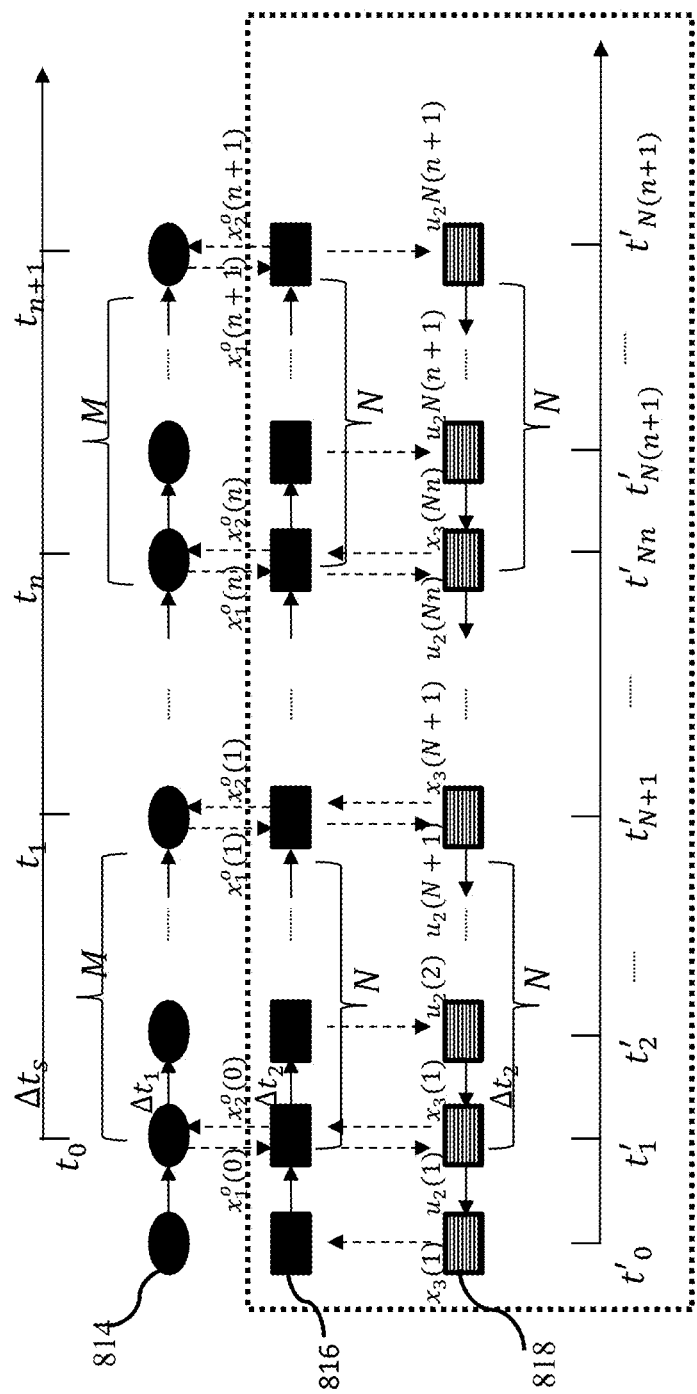
FIG. 8B shows a schematic of co-simulation with feedback control of equipment and optimal control of the airflow in the room based on thermal comfort and energy consumption cost function.

FIG. 8B shows a schematic of co-simulation with feedback control of the HVAC and optimal control of the airflow in the room based on thermal comfort and energy consumption cost function. It demonstrates, an example, how the CFD model for the ADM 224 with adjoint optimization can be synchronized with the dynamics of the HVAC 210 and the BEM 208. 814 shows solution of the HVAC model with Building Energy Simulation (BES) model with an initial guess. Results of such simulation is saved on a disk at a certain time interval, say $\Delta t_1$. In meantime, the ADM model solves the Navier-Stokes equations with heat transfer using the initial guess and outcome is saved on the disk 816. At this time, exchangeable variables $x_1^o(t_i)$, $x_2^o(t_i)$ are computed. The exchangeable variable, for example, correspond to the velocity and temperature at given sensor location or outlet using ADM or velocity and temperature at the inlet of the room using the HVAC model coupled with the BES.

Synchronized solution of 814 and 816 continues till first checkpoint $t_1$ is arrived. At this point, adjoint equations 818 are solved backward in time. The adjoint equations require CFD forward simulation data $u(t_i)$, examples of which are temperature, velocity and humidity in each location of the room at various times. In contrast to 814/816 coupling, the 816/818 approach deals with exchange of data between the CFD and adjoint solver at each time step of simulation. Solution of 818 yields adjoint variables, which in turn are used to calculate the sensitivity of the cost function with respect to the control variables (referred as $x_3(t_i)$). Such step can be iterated till a desired accuracy is achieved for $x_2^o(t_i)$, which is the optimal exchange value given by the CFD to the BES. After exchange of data between the CFD and the BES, an internal optimization/control is carried out for within the BES, e.g. using PI feedback control. The co-simulation of the HVAC model, the BES and the ADM along with the internal optimization for the BES and for the CFD (adjoint method) is carried out till final time $t_{n+1}$ is reached.

Control of the HVAC System

Figure 9:
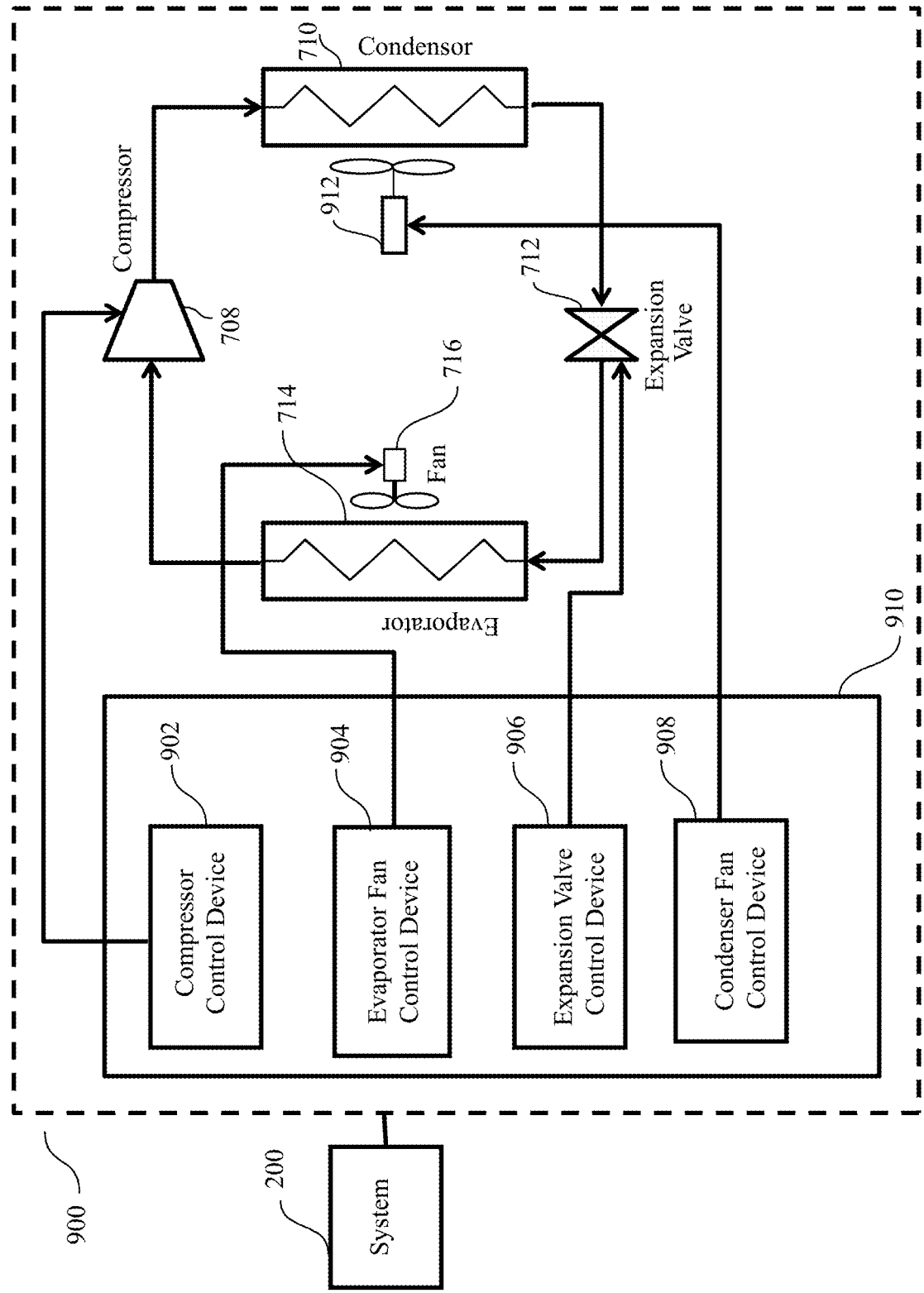
FIG. 9 shows a schematic of a HVAC system including a controller in communication with the system employing principles of some embodiments.

FIG. 9 shows a schematic of a HVAC system 900 including a controller 910 in communication with the system 200 employing principles of some embodiments. The controller 910 can be connected to the system 200 through the control interface 226. The controller 910 includes a compressor control device 902, an evaporator fan control device 904, an expansion valve control device 906, and a condenser fan control device 908. The system 200 is operatively connected to the controller 910 of the HVAC system, either wirelessly or through wires. Additionally, the system 900 includes a set of sensors to determine one or combination of signals indicative of measurements of the environment and measurements of the operations of the HVAC system 900.

Based on the embodiments of the present invention, the system 200 can determine the boundary conditions for outputs of the HVAC that can achieve the target thermal state distribution while minimizing the energy consumption of the HVAC system 900. To that end, the processor 204 of the system 200 determines, using the HVAC model, target control parameters of actuators of the HVAC system 900 corresponding to the target distribution of thermal state in the environment. Further, the control commands are generated corresponding to the target control parameters. The processor 204 submits the control commands to the HVAC system 900. In particular, the control commands are submitted to the controller 910 of the HVAC system 900 to operate the actuators and/or components of the HVAC system 900 according to the target control parameters.

To that end, in one embodiment, the controller 910 receives the control commands from the system 200. In some embodiments, the control commands include an optimal speed of the compressor 708. In such cases, the compressor control device 902 changes current compressor speed to the optimal speed according to the control commands. In some embodiments, the control commands include a position of the expansion valve 712. In such case, the expansion valve control device 906 actuates the expansion valve to a position defined by the control commands.

The HVAC system 900 includes the evaporator fan 716 and condenser fan 912 that are not actuated to achieve the target thermal distribution or the target control parameter. The control commands include optimal speed of the evaporator fan 716 and the condenser fan 912, respectively, such that the fans 716 and 912 consume less energy while achieving the target control parameters. The evaporator fan control device 904 controls the evaporator fan 716 according to the control commands including the optimal speed of the evaporator fan 716. Likewise, the evaporator fan control device 904 controls the condenser fan 912 based on the control commands including the optimal speed of the evaporator fan 716.

Since the control commands determined by the system 200 correspond to the target control parameters that result in the target distribution of thermal state, therefore, when the HVAC system 900 is operated according the control commands, the target distribution of thermal state in the environment is achieved. Further, as the actuators and/or components of the HVAC system 900 are controlled according to the aforementioned optimal values, the target distribution of thermal state is achieved with minimum energy consumption of the HVAC system 900. This in turn allows increasing thermal comfort of an occupant, while reducing energy consumption of HVAC system 900.

Further, in some cases, the occupants may change the target thermal distribution of thermal state, the layout of the environment may change over time, the outside temperature changes seasonally and/or daily. In such cases, the system 200 provides the control commands that can achieve the changed target thermal state distribution with the minimum energy consumption. Therefore, the system 200 yields a decisive advantage that HVAC system 900 can be controlled as per dynamic changes in the environment and different level of the occupants' comfort.

Design of the HVAC system

In a complex target thermal state distribution, for example, a warehouse, different sections are maintained at different thermal conditions, respectively. It may be considered that an HVAC system of simple design is installed at the warehouse (e.g., only with one inlet located in a corner of the warehouse). It may be realized that such complex target thermal state distribution cannot be achieved with such a simple HVAC system. It may also be realized that such complex target thermal state distribution can be achieved but by spending unreasonable amount of energy of the HVAC system.

To that end, some embodiments are based on objective of designing the HVAC system optimized for the target thermal state distribution in a target environment. Some embodiments are based on a recognition that such HVAC system can be achieved using principles explained in FIG. 1. Here, the design variables are optimized. In some embodiments, the design variables include number of inlets, inlet locations at the wall of the target environment, a size of air-conditioner (AC) diffuser and a number of AC units, orientation of the inlets (direction of blowing air) and the like. The design variables are optimized such that the optimized design variables generate the target thermal state distribution in an efficient manner. Further, the HVAC system is installed in accordance with the optimized design variables. In other words, for instance, a number of inlets, location of the inlets, and the orientation of the inlets are determined that can achieve the target thermal distribution in the optimal manner Subsequently, the determined number of inlets, the location of the inlets, and the orientation of the inlets are installed, thereby, producing the optimal design and structure of the HVAC system.

Additionally, or alternatively, optimizing the design variables includes determining other components of the HVAC system, e.g., a type of a compressor, a number of AC units, and a shape of diffuser, that can generate desired outputs for the determined inlets. Therefore, a refrigeration cycle that produces the target thermal state distribution can also be determined.

To that end, the processor 204 is configured to process the environmental data with the BEM 208 to estimate the thermal state of the air at the walls of the indoor environment. In some embodiments, the BEM 208 is utilized to estimate the thermal state at the inlet locations. Further, the processor 204 is configured to determine the one or more aforesaid design variables by minimizing a multi-objective cost function. The processor 204 iteratively minimizes the multi-objective cost function until a termination condition is met.

Figure 10:
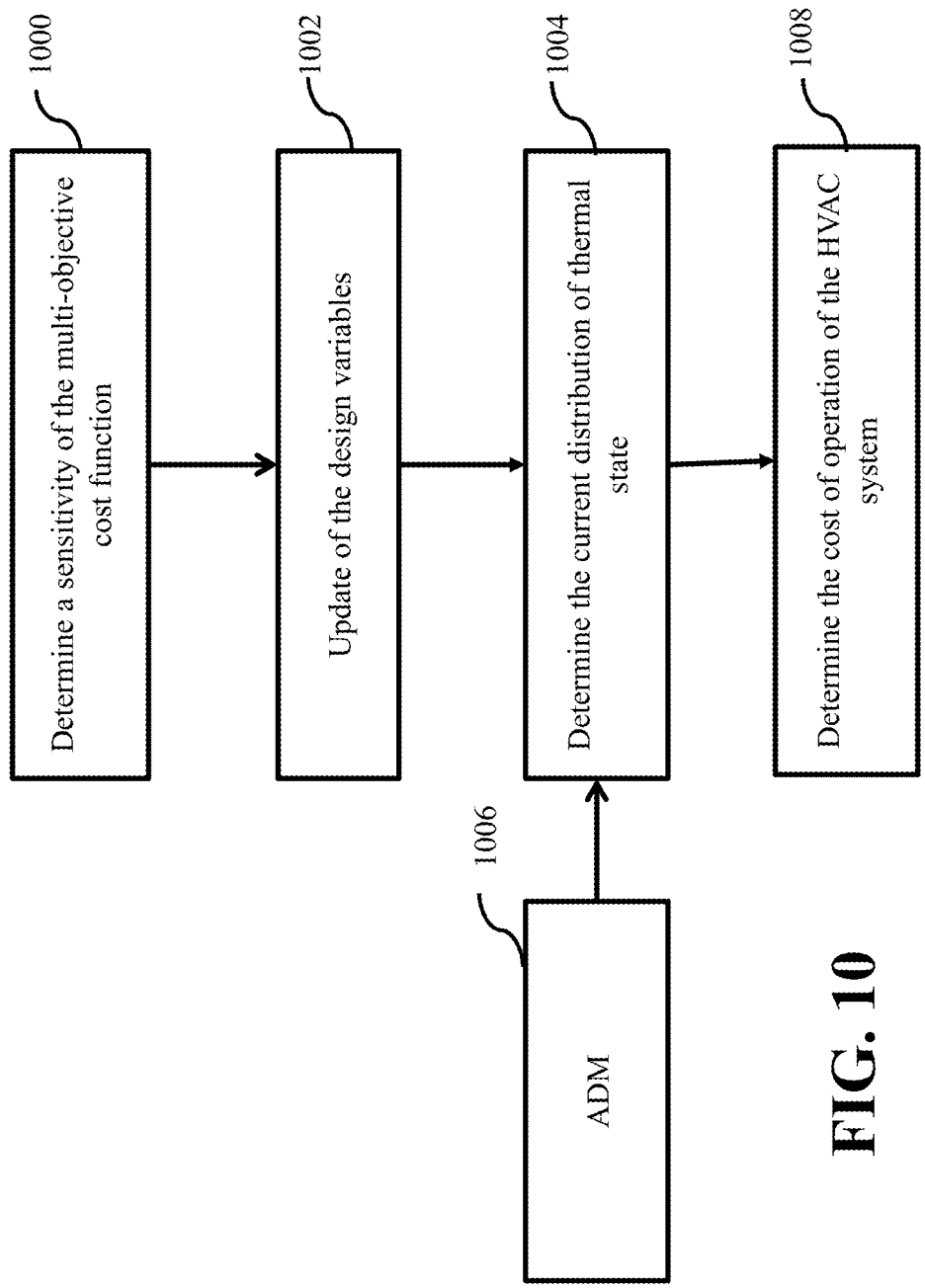
FIG. 10 shows a schematic of an iteration of minimization of a multi-objective cost function for designing the HVAC system, according to some embodiments.

FIG. 10 shows a schematic of an iteration of the minimization of the multi-objective cost function for designing the HVAC system, according to some embodiments. The multi-objective cost function is a combination of a cost of operation of the HVAC system and a difference between the target thermal state distribution and a current thermal distribution. A sensitivity of the multi-objective cost function is determined 1000, by the processor 204, to update the design variables 1002. The design variables are updated in a direction of the sensitivity of the multi-objective cost function.

Further, the current thermal state distribution is determined by the processor 204. In some embodiments, the current thermal state distribution is determined 1004 based on the ADM 1006 with boundary conditions including thermal state at the inlet locations defined by the BEM 208 and thermal state outside of the inlet locations produced by the operation of the HVAC system. In some other embodiments, the processor 204 is configured to determine the current distribution of thermal state according to the ADM with the updated design variables.

In an embodiment, the processor 204 is further configured to determine the cost of operation of the HVAC system 1008 resulting in the updated design variables. The processor 204 iteratively minimizes the multi-objective cost function until the termination condition is met. In some embodiments, the termination condition is met when the sensitivity of the cost function is less than a first threshold. In some other embodiments, the termination condition is met when a value of the cost function is less than a second threshold. In yet some other embodiments, the termination condition is met when a number of iterations is greater than a third threshold. The aforementioned thresholds may be predefined.

Figure 11:
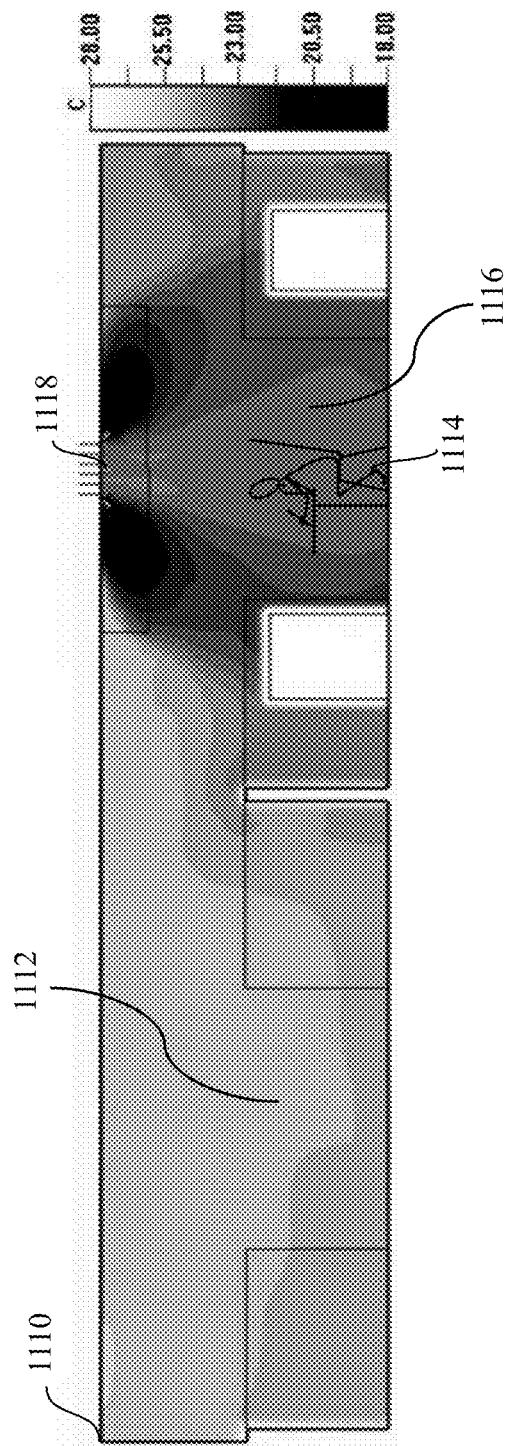
FIG. 11 shows a schematic of an HVAC system designed for a room, according to some embodiments.

FIG. 11 shows a schematic of an HVAC system designed for a room 1110, according to some embodiments. An occupant 1114 resides at a region 1116 of the room 1110. The region 1116 is referred to as the occupied region. The system 200 is associated with the HVAC system and receives desired thermal state of the occupant 1114. Further, as no occupant resides at a region 1112, the region 1112 of the room 1110 is referred to as unoccupied region. The system 200 is configured to design the HVAC system such that only the occupied region of the room 1110 is conditioned (cooled down or heated up) according to the desired thermal state. For example, location and angle of air vent can be considered as design variables and optimum location and angle of air vent 1118 is determined. The air vent 1118 conditions only the occupied region 1116. Since the HVAC system is designed such that only the occupied region of the room 1110 is conditioned and not the entire room 1110, energy consumption of the HVAC system is also optimized. Therefore, example embodiments aid in designing efficient HVAC systems.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A control system for controlling an operation of a heating ventilation and air conditioning (HVAC) system configured to condition an indoor environment by pushing air to the environment through a set of inlets arranged at a set of locations on one or multiple walls of the environment, wherein a thermal state of the air pushed to the environment at an inlet location includes one or combination of a temperature, a velocity and humidity of the air, the control system comprising:
   an input interface configured to accept data indicative of a target distribution of thermal state in the environment, wherein a thermal state at a location in the environment includes one or a combination of a temperature, a velocity, and humidity of the air;
   a memory configured to store an airflow dynamics model (ADM) defining a distribution of a thermal state in the environment subject to boundary conditions for thermal state of the air at the walls of the environment; and an HVAC model defining dynamics of the HVAC system;
   a processor configured to
   inverse the ADM to estimate values of the boundary conditions for the inlet locations defining target thermal state at the inlet locations that result in the target distribution of thermal state in the environment;
   determine, using the HVAC model, target control parameters of actuators of the HVAC system resulting in the target thermal state at the inlet locations; and
   submit control commands to the HVAC system to operate the actuators of the HVAC system according to the control parameters,
   wherein different combinations of values of target thermal state at the inlet locations result in the target distribution of thermal state in the environment, and wherein the processor selects a combination of thermal state based on a metric of performance of the HVAC system, wherein the metric of performance is defined by a multi-objective cost function of a combination of a cost of operation of the HVAC system and a difference between the target thermal distribution and a corresponding current thermal distribution, such that the processor is configured to determine the target thermal state by minimizing the multi-objective cost function, and wherein the processor iteratively minimizes the multi-objective cost function until a termination condition is met, wherein, for performing an iteration, the processor is configured to:
   determine a sensitivity of the cost function to an update of the boundary conditions for the inlet locations;
   update the boundary conditions at the inlet locations in a direction of the sensitivity; determine the current distribution of thermal state according to the ADM with the updated boundary conditions; and
   determine the cost of operation of the HVAC system resulting in the updated boundary conditions at the inlet locations.

2. The control system of claim 1, wherein the termination condition is met when the sensitivity of the multi-objective cost function is less than a first threshold, a value of the cost function is less than a second threshold, or a number of iterations is greater than a third threshold.

3. The control system of claim 1, wherein the memory further stores a building envelope model (BEM) defining the boundary conditions for thermal state of the air at the walls of the environment when the environment is not conditioned by the HVAC system, and wherein the processor initializes the boundary conditions by submitting values of thermal state outside of the environment to the BEM.

4. The control system of claim 1, wherein the target distribution of thermal state is uneven having at least two different values of thermal state at two different locations in the environment.

5. The control system of claim 1, wherein the target distribution of thermal state is provided for a section of the environment, and wherein the HVAC system conditions the environment to result in an uneven thermal distribution having at least two different values of thermal state at two different locations in the environment.

6. The control system of claim 1, wherein the ADM represents the dynamics of the air in the environment using Navier-Stokes equations and energy equations, wherein a computational fluid dynamics (CFD) calculation solves the Navier-Stokes equations and the energy equations to estimate the distribution of thermal state.

7. A method for controlling an operation of a heating ventilation and air conditioning (HVAC) system configured to condition an indoor environment by pushing air to the environment through a set of inlets arranged at a set of locations on one or multiple walls of the environment, wherein a thermal state of the air pushed to the environment at an inlet location includes one or combination of a temperature, a velocity and humidity of the air, wherein the method uses a processor coupled to a memory storing an airflow dynamics model (ADM) defining a distribution of a thermal state in the environment subject to boundary conditions for thermal state of the air at the walls of the environment; and an HVAC model defining dynamics of the HVAC system, the processor is coupled with stored instructions when executed by the processor carry out steps of the method, comprising:
- accepting data indicative of a target distribution of thermal state in the environment, wherein a thermal state at a location in the environment includes one or a combination of a temperature, a velocity, and humidity of the air;
- inversing the ADM to estimate values of the boundary conditions for the inlet locations defining target thermal state at the inlet locations that result in the target distribution of thermal state in the environment;
- determining, using the HVAC model, target control parameters of actuators of the HVAC system resulting in the target thermal state at the inlet locations; and
- submitting control commands to the HVAC system to operate the actuators of the HVAC system according to the control parameters,
wherein different combinations of values of target thermal state at the inlet locations result in the target distribution of thermal state in the environment, and wherein the processor selects a combination of thermal state based on a metric of performance of the HVAC system, wherein the metric of performance is defined by a multi-objective cost function of a combination of a cost of operation of the HVAC system and a difference between the target thermal distribution and a corresponding current thermal distribution, such that the processor is configured to determine the target thermal state by minimizing the multi-objective cost function, and wherein the processor iteratively minimizes the multi-objective cost function until a termination condition is met, wherein, for performing an iteration, the method comprises:
- determining a sensitivity of the cost function to an update of the boundary conditions for the inlet locations;
- updating the boundary conditions at the inlet locations in a direction of the sensitivity; determine the current distribution of thermal state according to the ADM with the updated boundary conditions; and
- determining the cost of operation of the HVAC system resulting in the updated boundary conditions at the inlet locations.

8. The method of claim 7, wherein different combinations of values of target thermal state at the inlet locations result in the target distribution of thermal state in the environment.

9. The method of claim 8, wherein the metric of performance is defined by a multi-objective cost function of a combination of a cost of operation of the HVAC system and a difference between the target thermal distribution and a corresponding current thermal distribution, such that the processor is configured to determine the target thermal state by minimizing the multi-objective cost function.

10. The method of claim 7, wherein the memory further stores a building envelope model (BEM) defining the boundary conditions for thermal state of the air at the walls of the environment when the environment is not conditioned by the HVAC system, and wherein the processor initializes the boundary conditions by submitting values of thermal state outside of the environment to the BEM.

11. The method of claim 7, wherein the target distribution of thermal state is uneven having at least two different values of thermal state at two different locations in the environment.

12. The method of claim 7, wherein the target distribution of thermal state is provided for a section of the environment, and wherein the HVAC system conditions the environment to result in an uneven thermal distribution having at least two different values of thermal state at two different locations in the environment.

* * * * *